(12) United States Patent
Jennings et al.

(10) Patent No.: US 9,447,890 B2
(45) Date of Patent: Sep. 20, 2016

(54) BACK PRESSURE REGULATOR WITH FLOATING SEAL SUPPORT

(75) Inventors: Jeffrey Dean Jennings, Hendersonville, NC (US); Tony Boyd Tang, Asheville, NC (US); Keith Alan Roberts, Penrose, NC (US)

(73) Assignee: Equilibar, LLC, Fletcher, NC (US)

( * ) Notice: Subject to any disclaimer, the term of this patent is extended or adjusted under 35 U.S.C. 154(b) by 147 days.

(21) Appl. No.: 14/128,224

(22) PCT Filed: Jun. 23, 2012

(86) PCT No.: PCT/US2012/043908
§ 371 (c)(1),
(2), (4) Date: Mar. 26, 2014

(87) PCT Pub. No.: WO2012/178132
PCT Pub. Date: Dec. 27, 2012

(65) Prior Publication Data
US 2014/0203198 A1      Jul. 24, 2014

Related U.S. Application Data

(60) Provisional application No. 61/501,152, filed on Jun. 24, 2011.

(51) Int. Cl.
*F16K 7/17* (2006.01)
*G05D 16/06* (2006.01)
(Continued)

(52) U.S. Cl.
CPC ............. *F16K 7/17* (2013.01); *G05D 16/063* (2013.01); *G05D 16/0638* (2013.01);
(Continued)

(58) Field of Classification Search
CPC ... Y10T 137/7836; F16K 1/42; F16K 7/126; F16K 7/16; F16K 7/17; F16K 25/00; F16K 31/165

USPC ............... 251/363; 13/510; 277/640
See application file for complete search history.

(56) References Cited

U.S. PATENT DOCUMENTS 3,642,026 A    2/1972  Sielaff
4,630,642 A *  12/1986 Detweiler ............. F16K 15/025
                                                        137/506

(Continued)

FOREIGN PATENT DOCUMENTS

BE    848126    1/1977
SU    1707382   1/1992

OTHER PUBLICATIONS

Roberts, Neil, Supplementary European Search Report for application EP12802255, Feb. 16, 2015, EPO, Munich.
(Continued)

*Primary Examiner* — Matthew W Jellett
(74) *Attorney, Agent, or Firm* — Trego, Hines & Ladenheim, PLLC (57) ABSTRACT

A sealing apparatus for a back pressure regulator includes: a body defining a process surface, and including: at least one process void communicating with the process surface; a recess disposed in the process surface; a floating support hub disposed in the recess, carrying an O-ring; a vent void communicating with the recess; an inlet port disposed in fluid communication with the at least one process void and adapted to be coupled in fluid communication with a fluid at a process pressure; and an outlet port disposed in fluid communication with the vent void; and a diaphragm having opposed reference and process sides, the diaphragm disposed against the body such that the process side is substantially coplanar with the process surface.

28 Claims, 6 Drawing Sheets

(51) Int. Cl.
*G05D 16/18* (2006.01)
*F16K 1/42* (2006.01)
*F16K 7/16* (2006.01)
*F16K 7/12* (2006.01)
*F16K 31/165* (2006.01)

(52) U.S. Cl.
CPC ....... *G05D 16/0655* (2013.01); *G05D 16/185* (2013.01); *F16K 1/42* (2013.01); *F16K 7/126* (2013.01); *F16K 7/16* (2013.01); *F16K 31/165* (2013.01)

(56) References Cited

U.S. PATENT DOCUMENTS

| | | | |
|---|---|---|---|
| 4,846,215 A | 7/1989 | Barree | |
| 5,137,050 A * | 8/1992 | Clarke | F16K 1/465 137/541 |
| 5,188,150 A * | 2/1993 | Esplin | F16K 1/42 137/630.14 |
| 5,485,984 A | 1/1996 | Itoi et al. | |
| 6,109,295 A * | 8/2000 | Santana | F16K 31/20 137/442 |
| 7,686,280 B2 * | 3/2010 | Lowery | F16K 7/14 251/331 |
| 8,480,057 B2 * | 7/2013 | Takahashi | F16K 99/0015 251/333 |
| 2003/0192589 A1 | 10/2003 | Jennings | |
| 2014/0367601 A1 * | 12/2014 | Rada | F16K 1/42 251/333 |

OTHER PUBLICATIONS

Biryukova, A., International Search Report for PCT/US2012/043908, Sep. 21, 2012, Moscow, Russia.

* cited by examiner

BACK PRESSURE REGULATOR WITH FLOATING SEAL SUPPORT

BACKGROUND OF THE INVENTION

The present invention relates to pressure regulation, and more particularly to a diaphragm-type valve which controls a process pressure to match a reference pressure signal.

Dome loaded back pressure regulators (BPR) are used in many applications, including many research reactors and gas analytical applications in laboratory environments. A typical laboratory example would be core analysis, which uses a heated reactor containing an earthen core sample. Hydrocarbon products are condensed from the gaseous outflow of the reactor as part of the analysis. A back pressure regulator is typically used to simulate various overburden pressures in the earth, and is installed downstream of the reactor. Typical pressure ranges for these applications is between 340 kPa and 21 MPa (50 psig and 3000 psig)

If an inert gas stream is introduced into the reactor, one of several designs of small back pressure regulators can be used to control the sample pressure. However, for many applications where a significant gas flow is undesirable or cannot be assured, a BPR with true zero-flow capability is required. In some applications, "zero flow" can be defined as a gas flow rate less than approximately 0.1 standard ml/hour (0.003 oz/hour). As another example, in a typical catalyst research application at 6.9 MPa (1000 psig) (assuming a typical system fluid volume in the range of 1 ml (0.06 in.$^3$) to 100 ml (6 in.$^3$), loss of less than approximately 1% of system pressure over 24 hours (with the system inlet blocked off) would be considered "zero flow."

While several designs are available that can provide true zero flow performance under limited process conditions, there is a need for a BPR design that can provide both precision and maintenance of pressure at true zero flow under a wide range of pressure set-points and temperatures.

One prior art BPR design is the MITY MITE back pressure regulator, formerly sold by Grove and now a Dresser Industries product. This BPR uses a simple soft diaphragm, typically polytetrafluoroethylene (PTFE), over a single outlet orifice to control back pressure. At high pressures, the PTFE is indented by the relatively large outlet hole and can develop a bubble-tight seal. This indentation of the PTFE, while useful in obtaining zero flow at higher pressures, also has real limitations on its low-pressure end and also contributes to imprecision and deadband. Though the MITY MITE design serves as a type of industry standard, there are several other disadvantages, including sealing failures after thermal cycling.

Another BPR design for zero-flow applications is described in U.S. Pat. No. 6,886,591, which modifies the MITY MITE approach by using more flexible diaphragms inside very specifically supported constraints. The '591 patent also describe a plurality of outlet holes. These are commonly sold with diaphragms including Stainless Steel foil, PTFE, PTFE/Glass, polyimide, VITON, and PEEK. This technology brings high precision across a very wide range of flow rates and pressures without significant deadband. However, the device of the '591 patent requires careful selection of the diaphragm for a specific pressure range in order to achieve zero-flow performance.

Another BPR design is disclosed in U.S. Pat. No. 4,846,215 to Barree. As detailed in the patent Barree uses an O-ring with a conventional O-ring groove around the single orifice to improve the sealing. While this approach offers potential for low flow performance due to the soft elastomeric seal, this is a very mechanically stressful environment for the soft O-ring to survive. Experiments suggest that the design of the O-ring groove is very critical for the proper functioning of the device. If the O-ring is fully supported by an inner wall of 80% to 85% of its height (as a standard static O-ring groove is), there can be problems achieving a true zero flow seal due to interference between the diaphragm and the hard inner wall. If an inner support is shortened to avoid interference between the support and the diaphragm, the result can be either a failure to flow or a failure to fully close. Detailed experiments with variable support height revealed that the O-ring can be pulled up out of the groove and contorted into non-circular patterns which block the outlet opening. This can be understood by imagining a sealing point of contact at the top of the o-ring, with differential pressure of 1000 psig across this seal. The mechanical stresses are exerted on the elastomer driving the material toward the center. Normal O-ring seals contain the elastomer, but this design provides the possibility for the O-ring to be extruded over the support wall and contorted inward.

This effect is exacerbated because the stresses on the O-ring cause it to become vertically elongated (oval) by the higher pressure on the outer wall of the O-ring than the inner. This means that the O-ring is further elevated above the support wall. In summary, it is practically difficult to identify a support wall height which will reliably contain the O-ring at a variety of pressures without becoming blocked by the O-ring being extruded above the support wall. Even when an O-ring and groove geometry is identified which appears to function through a wide range of pressures with a limited range of gas flow rates, the flow performance becomes unreliable when a higher flow rate of gas further stresses the O-ring.

Accordingly, there is a need for a high precision back pressure regulator with true zero flow capability over a wide range of pressure set points, flow rates, and temperatures.

BRIEF SUMMARY OF THE INVENTION

This need is addressed by the present invention, which provides a high precision BPR incorporating an O-ring seal supported by a floating hub.

According to one aspect of the invention, a sealing apparatus for a back pressure regulator includes: a body defining a process surface, and including: at least one process void communicating with the process surface; a recess disposed in the process surface; a floating support hub disposed in the recess, carrying an O-ring; a vent void communicating with the recess; an inlet port disposed in fluid communication with the at least one process void and adapted to be coupled in fluid communication with a fluid at a process pressure; and an outlet port disposed in fluid communication with the vent void; and a diaphragm having opposed reference and process sides, the diaphragm disposed against the body such that the process side is substantially coplanar with the process surface.

According to another aspect of the invention, a back pressure regulator apparatus includes: a body defining a process surface, and including: at least one process void communicating with the process surface; a recess disposed in the process surface; a floating support hub disposed in the recess, carrying an O-ring; a vent void communicating with the recess; an inlet port disposed in fluid communication with the at least one process void and adapted to be coupled in fluid communication with a fluid at a process pressure; and an outlet port disposed in fluid communication with the vent void; a reference cap including a reference surface and a reference port disposed in fluid communication with the reference surface, the reference port adapted to be coupled in fluid communication with a fluid at a predetermined reference pressure; and a diaphragm having opposed reference and process sides, the diaphragm constrained between the body and the reference cap such that the process side is substantially coplanar with the process surface, and arranged such that, in response to the process pressure being higher than the reference pressure, a fluid flow path will be open that extends from the at least one process void past the O-ring to the vent void, and in response to the reference pressure being higher than the process pressure, the flow path will be closed.

According to another aspect of the invention, a back pressure regulator apparatus includes: a body defining a process surface, and including: at least one process void communicating with the process surface; a recess disposed in the process surface; a floating support hub disposed in the recess, carrying an O-ring; a vent void communicating with the recess; an inlet port disposed in fluid communication with the at least one process void and adapted to be coupled in fluid communication with a fluid at a process pressure; and an outlet port disposed in fluid communication with the vent void; a reference cap including a reference surface; a diaphragm having opposed reference and process sides, the diaphragm constrained between the body and the reference cap such that the process side is substantially coplanar with the process surface; and a platen loaded by a spring disposed within the reference cap such that the platen applies a reference force to the diaphragm, wherein the diaphragm is arranged such that, in response to forces exerted on the diaphragm by the process pressure being higher than the reference force, a fluid flow path will be open that extends from the at least one process void past the O-ring to the vent void, and in response to the reference force being higher than the forces exerted on the diaphragm by the process pressure, the flow path will be closed.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
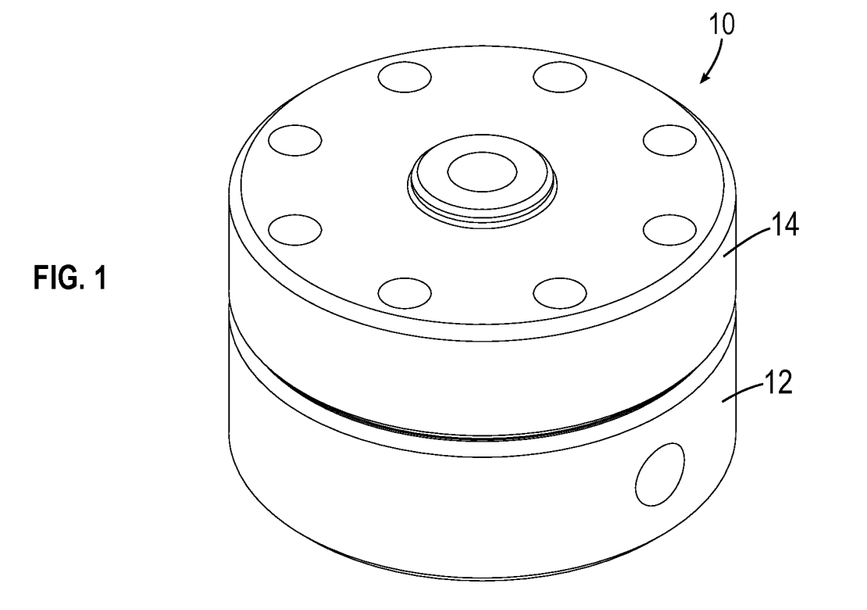
FIG. 1 is a perspective view of a dome-loaded back pressure regulator constructed in accordance with an aspect of the present invention.
Figure 2:
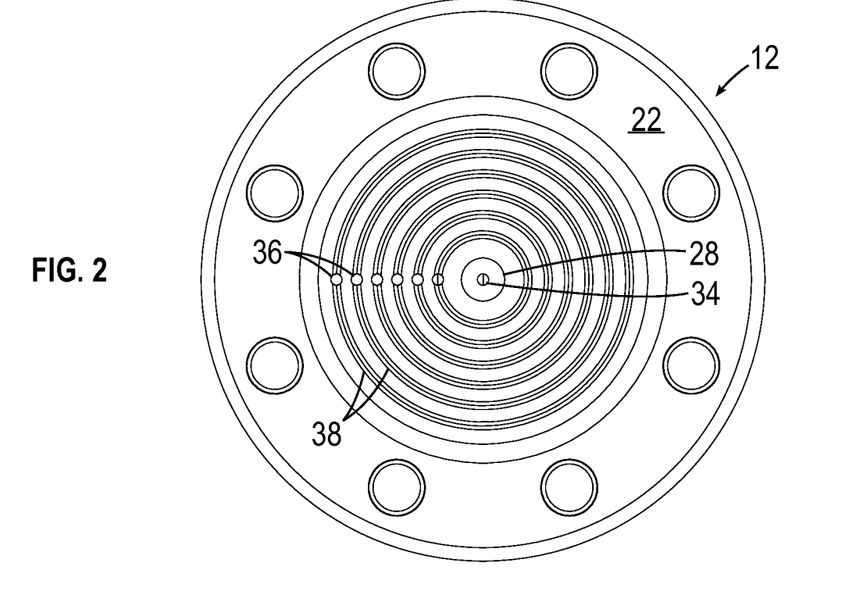
FIG. 2 is a top view of a body of the back pressure regulator of FIG. 1.
Figure 3:
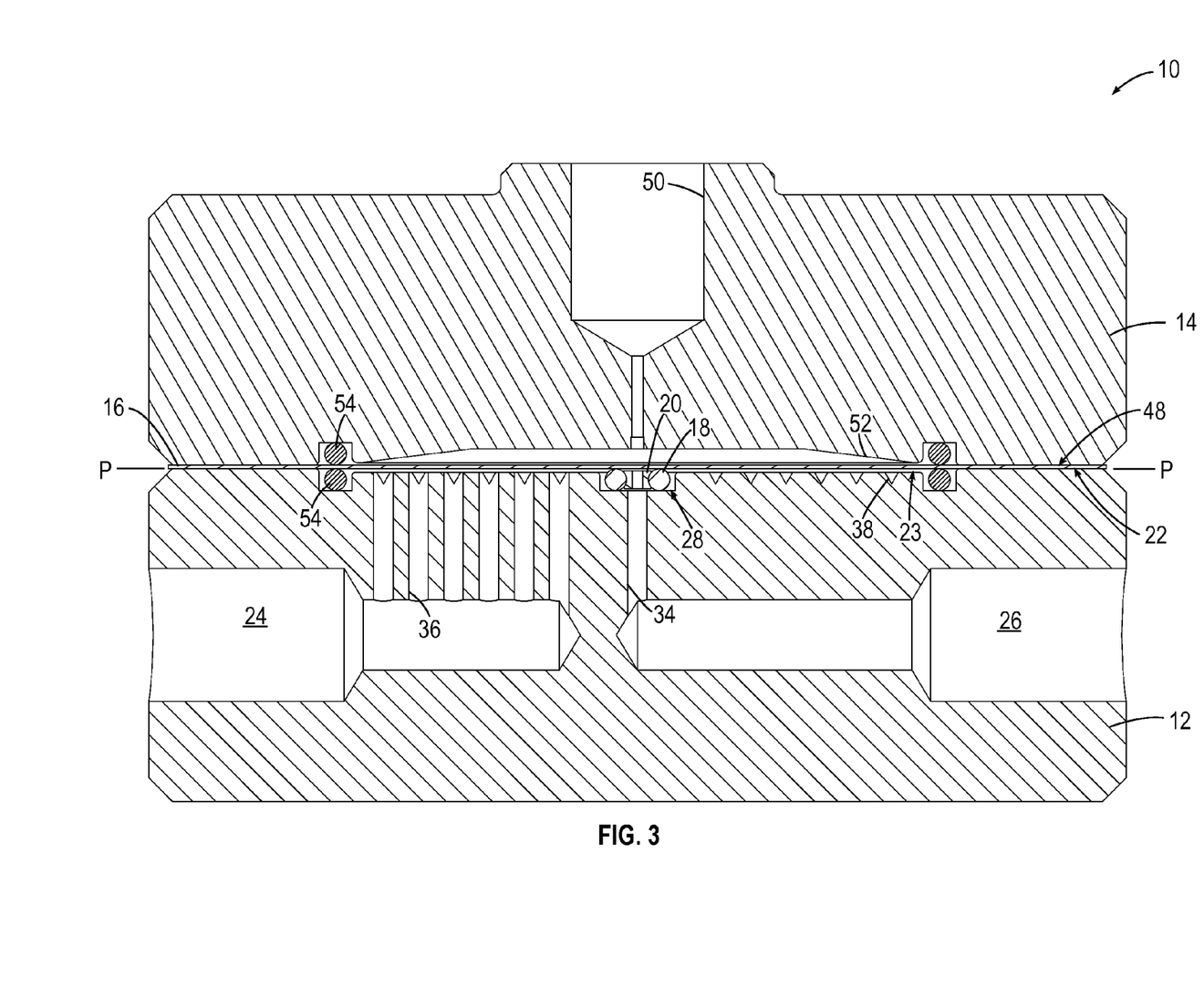
FIG. 3 is a cross-sectional view of the back pressure regulator of FIG. 1.

Referring to the drawings wherein identical reference numerals denote the same elements throughout the various views, FIGS. 1-3 depict an exemplary back pressure regulator 10 constructed according to an aspect of the present invention.

For purposes of explanation, it is noted that "back pressure regulator" and "relief valve" are two similar terms which describe the same functional device, though with different operational emphases. For relief valves, the emphasis is on the off/on flow interface, with expectations of zero flow through the device up to some predetermined set pressure, and maximum flow above the set pressure. For back pressure regulators, the emphasis is often on steady state flow control over a defined flow rate window, with less emphasis on the off/on flow threshold. It is noted that the back pressure regulator 10 described herein is suitable for use with gases, liquids, or two-phase systems.

The back pressure regulator 10 includes a body 12 and a reference cap 14. A diaphragm 16 is sandwiched between the body 12 and the reference cap 14. An O-ring 18 is carried on a support hub 20 disposed between the diaphragm 16 and the body 12.

The body 12 may be cast, machined, or built-up from separate components. The material of the body 12 is selected to suit a particular application based on requirements such as temperature, pressure, chemical compatibility, etc. Non-limiting examples of suitable materials which are chemical-resistant include 300 series stainless steel, HASTELLOY (a nickel-based "superalloy"), PVC, brass, and PEEK. The body 12 includes a generally planar process surface 22. Inlet and outlet ports 24 and 26 are also formed in the body 12. The central axes of these ports may be coplanar or substantially coplanar with each other, and the plane of these axes may be parallel with the process surface 22. These two ports 24 and 26 may be diametrically opposed relative to the body 12 and co-axial with each other as well.

Figure 4:
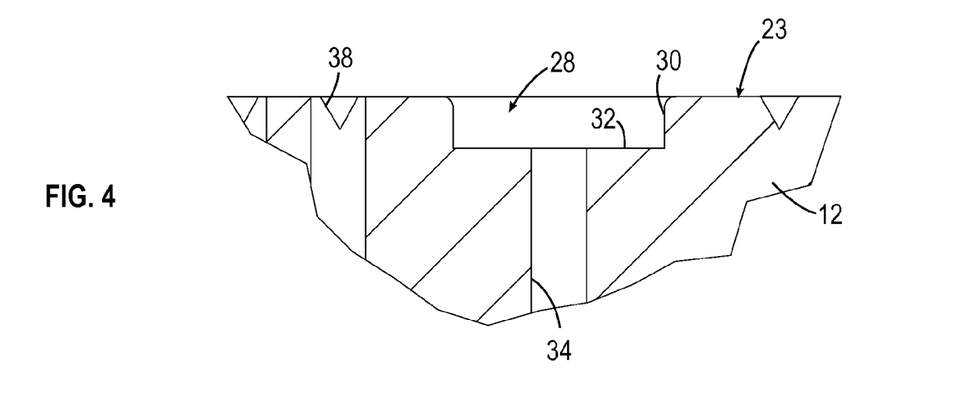
FIG. 4 is an enlarged view of a portion of a body of the back pressure regulator of FIG. 1.

As best seen in FIG. 4, an open recess 28 is formed in the process surface 22. The recess is cylindrical in form, with an annular side wall 30 and a planar bottom wall 32. It receives the support hub 20, described in more detail below. A single vent void 34 is centrally located in the body 12 and is disposed in fluid communication with the outlet port 26 and the bottom wall 32 of the recess 28.

At least one process void 36 is disposed in fluid communication with the inlet port 24 and the process surface 22, outside of the O-ring 18. The function of the process void (or voids) 36 is to bring the process fluid into the back pressure regulator 10. The size of the process voids 36 is not a critical design parameter, but they are preferably sized so that the total cross sectional area of the process voids 36 is significantly larger than the cross sectional area of the vent void 34. In the illustrated example (best seen in FIGS. 2 and 3), six circular process voids 36 of approximately 1.9 mm (0.075 in.) diameter yield a total process void area of about 17.0 mm$^2$ (0.03 in.$^2$).

The process surface 22 incorporates grooves 38 which are effective to prevent the diaphragm 16 from being able to seal off the process voids 36 and to distribute fluid from some or all of the process voids 36 across the process surface 22. As an example, grooves with a "V"-shaped cross-section and extending approximately 0.76 mm (0.03 in.) deep from the process surface 22 (see FIG. 4) are suitable for this purpose. A significant portion of the process void or voids 36, may be located within one of the grooves 38 (that is, a centerline of the groove 38 passes through a center of the process void 36).

The grooves 38 may be configured in any pattern which is effective to distribute fluid from the process voids 36 as described above. For the back pressure regulator described a suitable configuration would be for the grooves 38 to be arranged as a series of concentric circles concentric with the body 12 so that they can be fabricated using a lathe or circular milling action.

Figure 11:
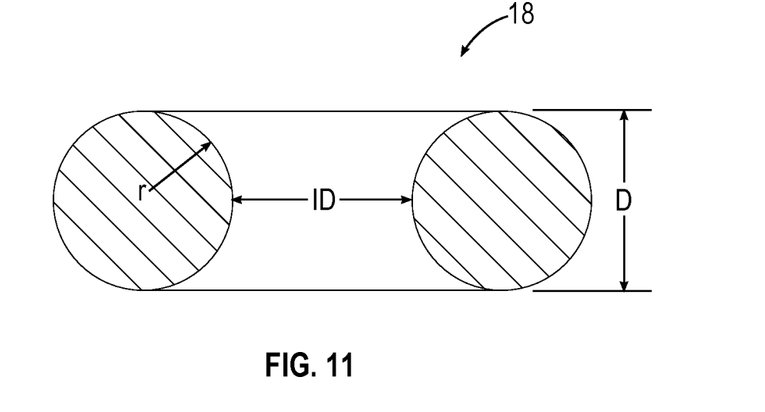
FIG. 11. is a cross-section view of an O-ring.

The O-ring 18 has elastomeric properties and is of conventional form, with an inside diameter "ID" and a cross-sectional diameter "D" (see FIG. 11). Nonlimiting examples of suitable materials for the O-ring 18 include fluorocarbon elastomers such as VITON or KALREZ, synthetic rubbers such as Buna, and silicone. As an example, the O-ring 18 may have a hardness in the range of 60 to 90 Shore A.

Figure 5:
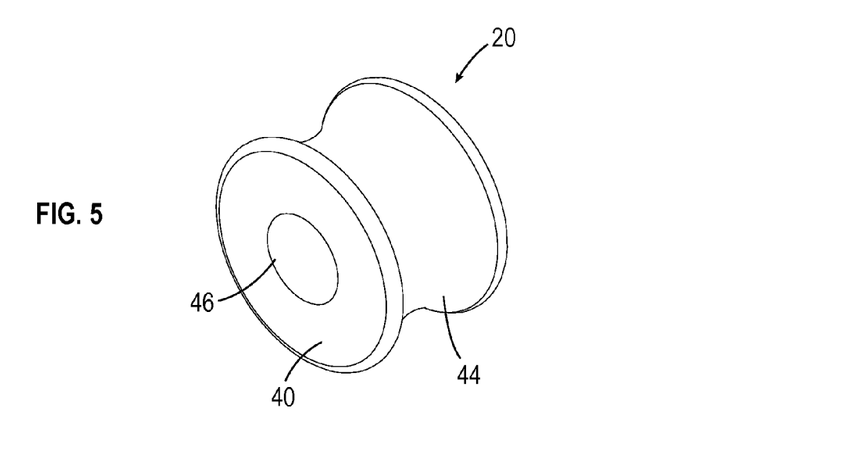
FIG. 5 is a perspective view of a support hub of the back pressure regulator of FIG. 1.
Figures 6, 7:
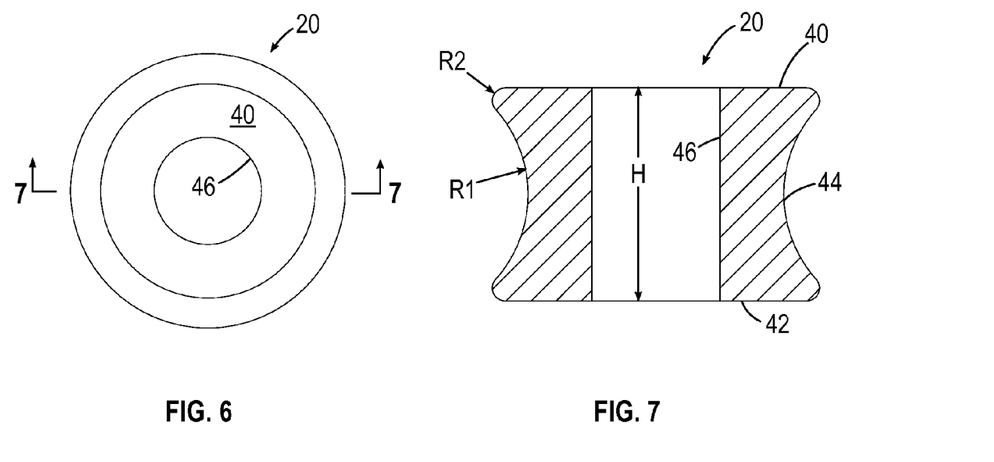
FIG. 6 is a top view of the support hub shown in FIG. 5.
FIG. 7 is a view taken along lines 7-7 of FIG. 6.
Figure 8:
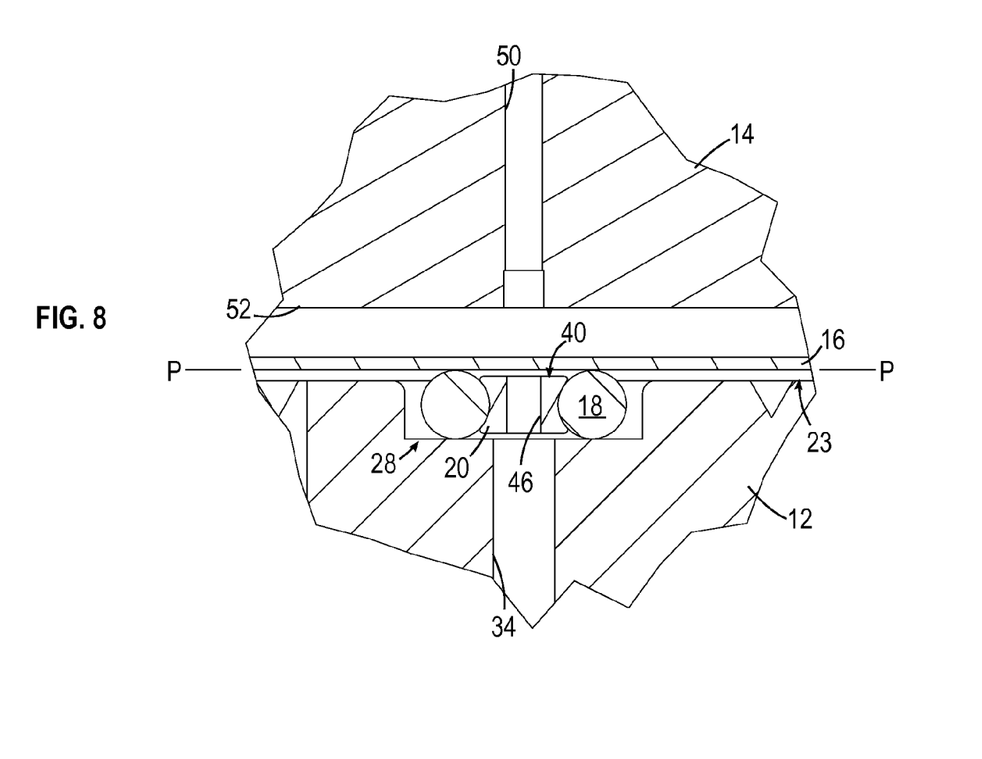
FIG. 8 is an enlarged view of a portion of a body of the back pressure regulator of FIG. 1 with a support hub installed therein.

The support hub 20, illustrated in FIGS. 5-7, is made of a rigid or nondeformable material such as a metal alloy. Nonlimiting examples of suitable alloys include 300 series stainless steel and HASTELLOY. The rigidity of the support hub 20 is relative to the O-ring 18, that is, the support hub 20 must be strong and rigid enough to support the O-ring 18, but need not have a specific absolute hardness or stiffness. It is generally cylindrical and includes an upper face 40, a lower face 42, and an annular side wall 44 extending between the upper and lower faces 40 and 42. The side wall 44 may include a concave cross-sectional shape. To the extent that the side wall 44 has a concave shape, it side wall may be thought of as defining a groove that receives the O-ring 18. A central bore 46 extends through the support hub 20 from the upper face to the lower face 42. The support hub 20 receives and retains the O-ring 18 against the side wall 44.

The support hub height "H" (i.e. its overall axial dimension between the upper and lower faces 40 and 42) is selected with reference to the O-ring cross-sectional diameter "D" (see FIG. 11). Preferably, the height H is between about 60% and about 90% of the cross sectional diameter D of the O-ring 18. More preferably, the height H is between about 70% and about 80% of the cross-sectional diameter D of the O-ring 18.

As noted above, the side wall 44 of the support hub 20 may incorporate a concave radius "R1". Functionally, the purpose of the curvature is to prevent the O-ring 18 from slipping axially off the support hub 20, and also provides a "cradling" effect which is believed to enhance support of the O-ring 18 under operating pressure. However, it is believed that the side wall 44 may be much straighter (i.e. having a much higher radius of curvature), and still retain its effectiveness. It may also have a significantly lower radius of curvature. An exemplary range of the radius R1 is about 90% to about 150% of the O-ring cross-sectional radius. Satisfactory performance has been observed where the side wall 44 of the support hub 20 has a concave radius "R1" approximately equal to the cross-sectional radius "r" (see FIG. 11) of the O-ring 18. The support hub 20 may optionally include a secondary radius "R2" or convex-curved fillet on the circumferential edge between the side wall 44 and the upper face 40. This is recommended to prevent cutting of the O-ring 18 as inward stresses press on the top of the support hub 20. A secondary radius R2 of about 5% to about 10% of the O-ring cross sectional radius r is suitable to prevent cutting.

The reference cap 14 (see FIG. 3) may be cast, machined, or built-up from separate components. Like the body 12, the material of the reference cap 14 is selected to suit a particular application based on requirements factors such as temperature, pressure, chemical compatibility, etc. Because the reference cap 14 is non-wetted by the fluid process, it may be constructed of strong but not chemically-resistant materials (such as carbon steel) as well as chemically resistant stainless steel or other suitable materials. The reference cap 12 includes a peripheral portion defining a generally planar reference surface 48. A reference port 50 is formed in the reference cap 12. A cavity 52 is also formed in the reference surface 48 to allow movement of the diaphragm 16.

The diaphragm 16 has opposed sides referred to as reference and process sides, with the process side facing the process surface 22 and the reference side facing the reference surface 48. The outer perimeter of the diaphragm 16 is secured between the body 12 and the reference cap 14. The diaphragm 16 may be constructed from a material which is chemically inert and/or chemically resistant. It is preferred that the diaphragm 16 be substantially "stiff", meaning that it does not easily yield or conform under expected operating pressures, avoiding the diaphragm 16 being imprinted from contact with the O-ring 18. Nonlimiting examples of suitable diaphragms 16 would be a polyimide diaphragm of thickness between 0.13 mm (0.005 in.) and 0.76 mm (0.030 in.), or a stainless steel diaphragm of thickness between 0.05 mm (0.002 in.) and 0.25 mm (0.010 in.). Acceptable test results have been achieved with polyimide diaphragms of 0.51 mm (0.020 in.) thickness, and stainless steel diaphragms of 0.1 mm thickness (0.004 in.).

FIG. 3 depicts the back pressure regulator 10 in an assembled condition. The body 12 and the reference cap 14 are clamped together. For example, threaded fasteners, an external clamp, a mechanical joint or interference fit, or even welding or adhesives may be employed to clamp the body 12 and the reference cap 14 together. The diaphragm 16 is clamped between the reference surface 48 and the process surface 22. The mating process surface 22 and reference surface 48 cooperatively define a plane of constraint "P" of the diaphragm 16. The reference port 50 is disposed in fluid communication with the reference side of the diaphragm 16. The diaphragm 16 may be sealed with either an O-ring 54 on each side of the diaphragm 16, a crush seal, or other known sealing method. The dimensions of the sealing perimeter define the diaphragm's "free diameter" or the outside diameter of the portion of the diaphragm 16 which is free to flex up and down while the diaphragm's perimeter is restrained. In the illustrated example, the free diameter of the diaphragm 16 is about 40.6 mm (1.6 in.).

The support hub 20 with the attached O-ring 18 combination sits in the recess 28. The support hub 20 is "floating" with respect to the recess 28 and can rise or fall to adjust its position as necessary during operation. As used herein, the term "floating" refers to the fact that the support hub 20 is not physically attached to the recess 28. In practice, the outer diameter of the O-ring 18 may or may not contact the side wall 30 of the recess 28, depending on the relative dimensions of the two components. O-ring contact with the side wall 30 may limit the freedom of movement of the support hub 20 to some degree. This is not believed to affect the performance of the device. The bottom wall 32 of the recess 28 is also considered a sealing surface for the O-ring 18 and must be free of scratches that would permit leakage.

Optionally, the O-ring 18 when installed in its groove, may be exposed significantly above the surrounding support surface. This may be accomplished by recessing the central portion 23 of the process surface 22 relative to the diaphragm constraint plane P (i.e. the outer perimeter of the process surface 22). This serves to concentrate the forces on the unsupported diaphragm 16 around the O-ring 18. For example, the O-ring 18 may protrude above the central portion 23 by about 0.4% to about 1.25% of the free diameter of the diaphragm 16.

Optionally, the top of the O-ring 18 may be disposed at a level that is slightly above that of the diaphragm constraint plane P. This may be accomplished by selection of the O-ring size and the depth of the recess 28. For example the top of the O-ring 18 may be between about 0 to about 1.25% of the free diameter of the diaphragm 16 above the diaphragm constraint plane P. In the illustrated example, the top of the O-ring 18 is about 0.2% of the free diameter of the diaphragm 16 above the diaphragm constraint plane P. This serves to provide more of a closing bias to assist in the sealing of the seat; higher differentials would support more of a closing bias with relatively higher overpressure. This closing bias is provided by the stiffness of the diaphragm 16 itself preloading the O-ring 18, independent of fluid differential pressures.

Figure 9:
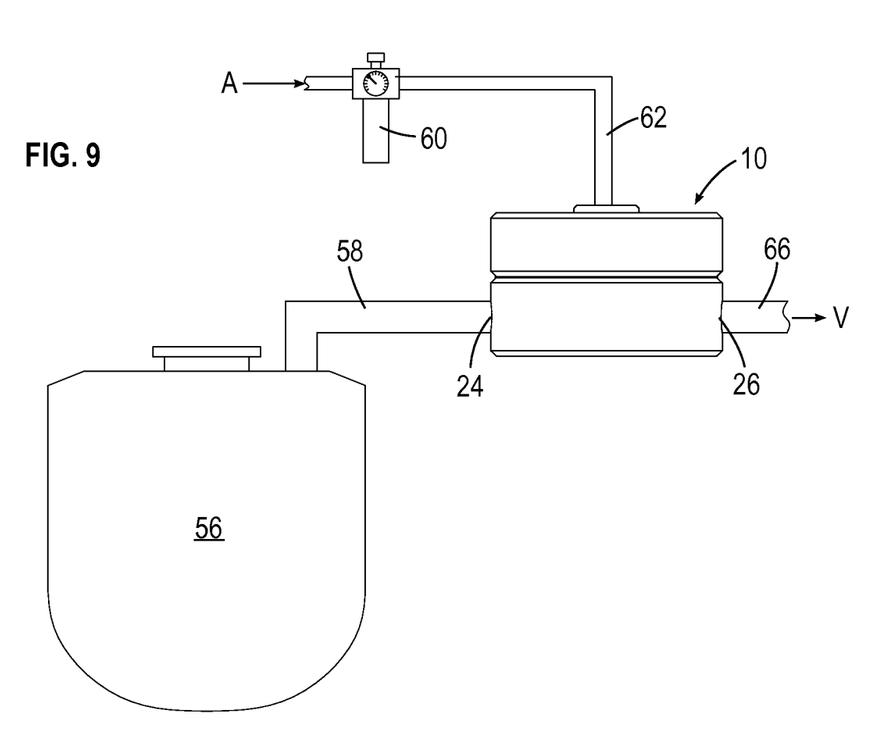
FIG. 9 is a schematic view of the back pressure regulator of FIG. 1 coupled to a process system.

In operation, the inlet port 24 is connected to a process pressure stream in a known manner, the reference port 50 is connected to a reference pressure, and the outlet port 26 is vented appropriately. For example, as shown in FIG. 9, the inlet port 24 may be connected to a process reactor 56 of a known type by a process line 58. The reference portion 50 may be connected to a known type of device for generating a reference pressure, such as a pneumatic pressure regulator 60, by a line 62, which is in turn connected to a reference pressure source such as compressed instrument air or a gas cylinder "A". The reference port 26 may be vented to atmosphere "V" by a simple vent line 66. During normal balanced or modulating mode the diaphragm 16 is drawn into a sealing relationship with the O-ring 18 due to the pressure differential between the vent pressure and reference pressure. When the process pressure exceeds the reference pressure the diaphragm 16 is persuaded away from the O-ring 18 thereby allowing venting. It should be noted that during operation, a vent flow path (that is, a flow path from the process voids 36 to the vent void 34) may be opened either between the diaphragm 16 and the O-ring 18, or the O-ring 18 and the bottom wall 32 of the recess 28, or both. In other words, the back pressure regulator 10 is equally effective whether the O-ring seal is modulating against the diaphragm 16 or the recess 28.

During operation, the side wall 44 of the support hub 20 cradles and thus mechanically supports the O-ring 18. As the O-ring 18 becomes distorted by the pressure differentials, the axial position of the support hub 20 adjusts relative to the depth of the recess 28 to remain beneficially mechanically supporting the O-ring 18.

Testing results of the back pressure regulator 10 described above show a more robust performance that prior art designs. The two forms of performance failure intermittently experienced by a comparison prototype constructed in accordance with the Barree BPR described above (i.e. failure to flow with normal overpressure; failure to seal with underpressure) were not experienced using the floating support hub 20.

A movement gap is provided above the diaphragm constraint to allow the diaphragm 16 to move upward above the O-ring 18. This movement gap is controlled by the size of the cavity 52 in the reference cap 14. The total movement gap is defined as the distance that the diaphragm 16 can move above the relaxed stated of the O-ring 18 while the support hub 20 is inserted in the bottom of the recess 28. The movement gap may be any value so long as it provides sufficient clearance for the diaphragm 16 to disengage from the O-ring 18 during venting, even when the O-ring's cross-sectional area becomes vertically elongated in response to the pressure differential across it, and is small enough to prevent the O-ring 18 from slipping out of its position in the recess 28. In the illustrated example it has been found that a movement gap of slightly over 2% of the free diameter of the diaphragm 16 is sufficient.

Testing results of the back pressure regulator 10 show exceptionally robust performance at pressures from 69 kPa (10 psig) to 20.7 MPa (3000 psig) as tested, with expected performance down to much lower pressures such as 34 kPa (5 psig) and expected high pressure performance up to 34.5 MPa (5000 psig) using elastomeric O-rings (in the typical range of 60 to 90 Shore A). More durable O-ring materials would be recommended to take the performance up to the 69 MPa (10,000 psig) range The design demonstrated excellent precision for gas flow rates from zero flow up to about 5 slpm.

The back pressure regulator 10 described above typically controls the inlet or process pressure in the range of from 100% to 101% of reference pressure, even at zero flow. Testing has shown zero bubbles or portions of a bubble being emitted from the back pressure regulator 10 over hours or days while the inlet remained blocked off and under pressure. A bubble meter or capillary tubing showed no advancement of a bubble or soap film over several hours. End-use customers would typically experience no loss of pressure on the inlet pressure gauge with a blocked inlet over hours or days.

Where the controlled system (e.g. the reactor 56) operates at high pressures and inherently generates higher flow rates, the O-ring 18 can be eroded by higher velocities of gas, sometimes the degradation is very rapid for very high flow rates. This effect is accelerated at elevated temperatures. For this reason, the present invention is especially suitable for lower-flow applications such as those found in lab-scale research and reservoir testing applications. A preferred application of this invention is for applications below 5 standard liter/minute ("slpm"). Typical applications have a maximum flow rate below 1 standard liter/minute. Some reservoir testing applications have maximum gas flow rates below 10 ml/min, with certain subapplication maximum flow rates as low as 0.1 ml/minute gas. This statement is not to be considered a maximum flow limitation of this design.

As described above the back pressure regulator 10 is "dome-loaded", that is, the reference pressure is introduced by way of a pressurized fluid acting on the diaphragm 16. It is also possible to introduce the reference pressure through mechanical means, or a combination of mechanical and fluid pressure means.

Figure 10:
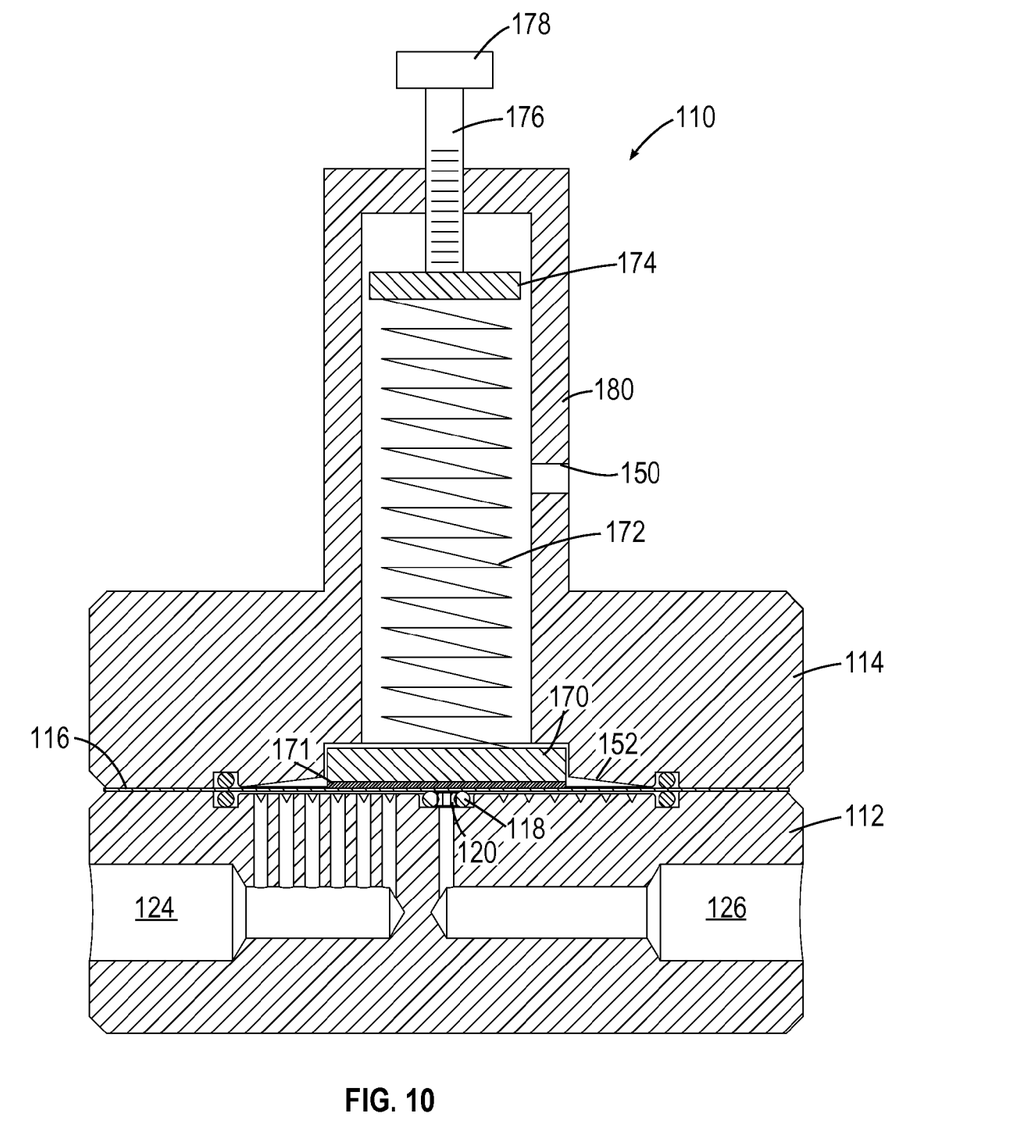
FIG. 10 is a cross-sectional view of an alternative back pressure regulator.

For example, FIG. 10 depicts an alternative back pressure regulator 110 constructed according to an aspect of the present invention. Its general construction is similar to that of the back pressure regulator 10 described above, differing only in the construction of the reference cap. It includes a body 112 with inlet and outlet ports 124 and 126 respectively, a reference cap 114, a diaphragm 116, and an O-ring 118 carried by a support hub 120.

The reference cap 114 includes a cavity 152 which provides a movement gap for the diaphragm 116 and also receives and locates a platen 170 which contacts the upper or reference side of the diaphragm 116. The platen 170 is a substantially rigid member that serves to spread out the load applied by a compression-type spring 172 disposed above the platen 170. The platen 170 may optionally have a compliant bottom surface 171 (such as an elastomeric layer) so as to more precisely apply even pressure to the top of the diaphragm 170. The lower end of the spring 172 contacts the platen 170 and the upper end of the spring contacts an adjuster assembly comprising a pressure plate 174, adjustment screw 176, and adjustment knob 178. An upright housing 180 that forms part of the reference cap 114 encloses the spring 172 and adjuster assembly. A reference port 150 is formed in the housing 180.

The basic operation of the back pressure regulator 110 is substantially identical to that of the back pressure regulator 10 described above, the primary difference being that in the back pressure regulator 110, the reference pressure may be applied by fluid pressure introduced into the reference port 150, by mechanical pressure applied to the diaphragm 116 through the spring 172 and platen 170, or by some combination thereof.

Turning the adjustment screw 176 inwards (downward in the figure) to a desired degree preloads the spring 172 which in turn applies a corresponding load to the diaphragm 116. The adjuster assembly may be used to bias the back pressure regulator's set point after a gross reference pressure has been applied through the reference port 150, or it may be used by itself to provide a completely self-contained device.

The foregoing has described a back pressure regulator. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A sealing apparatus for a back pressure regulator comprising:
   a body defining a process surface, and including a vent void communicating with the process surface;
   a generally cylindrical floating support hub including an annular side wall extending between spaced-apart upper and lower ends, and a central bore extending between the upper and lower ends, wherein the side wall has a shape that receives and supports an O-ring, wherein a height of the hub measured between the upper and lower ends is less than a cross-sectional diameter of the O-ring; and
   wherein the support hub and O-ring are disposed between the diaphragm and the process surface, in fluid communication with the vent void, and wherein a gap is present between the hub and the process surface.

2. The apparatus of claim 1, further including:
   at least one process void in the body communicating with the process surface, separate from the vent void;
   a reference cap including a reference surface, wherein the diaphragm is constrained between the body and the reference cap;
   a spring disposed within the reference cap such that the spring applies a reference force to the diaphragm; and
   wherein the diaphragm is arranged such that, in response to forces exerted on the diaphragm by the process pressure in the process void being higher than the reference force, a fluid flow path will be open that extends from the at least one process void past the O-ring to the vent void, and in response to the reference force being higher than the forces exerted on the diaphragm by the process pressure, the flow path will be closed.

3. The apparatus of claim 1 wherein the sidewall is concave-curved and a radius of the concave-curved side wall is between about 90% and about 150% of a cross-sectional radius of the O-ring.

4. The apparatus of claim 1 wherein the floating support hub includes a convex-curved fillet disposed between the upper face and the side wall.

5. The apparatus of claim 1 wherein a radius of the fillet is about 5% to about 10% of a cross-sectional radius of the O-ring.

6. The apparatus of claim 1 wherein a height of the support hub between the upper and lower faces is between about 60% and about 90% of a cross-sectional diameter of the O-ring.

7. A back pressure regulator apparatus comprising:
   a body defining a process surface, and including:
      at least one process void communicating with the process surface;
      a recess disposed in the process surface;
      a floating support hub disposed in the recess, carrying an O-ring, wherein a height of the hub measured between upper and lower ends thereof is less than a cross-sectional diameter of the O-ring, and wherein a gap is present between the hub and the process surface;
      a vent void communicating with the recess;
      an inlet port disposed in fluid communication with the at least one process void and adapted to be coupled in fluid communication with a fluid at a process pressure; and
      an outlet port disposed in fluid communication with the vent void;
   a reference cap including a reference surface and a reference port disposed in fluid communication with the reference surface, the reference port adapted to be coupled in fluid communication with a fluid at a predetermined reference pressure; and
   a diaphragm having opposed reference and process sides, the diaphragm constrained between the body and the reference cap such that the process side is substantially coplanar with the process surface, and arranged such that, in response to the process pressure being higher than the reference pressure, a fluid flow path will be open that extends from the at least one process void past the O-ring to the vent void, and in response to the reference pressure being higher than the process pressure, the flow path will be closed.

8. The apparatus of claim 7 wherein the process surface incorporates at least one groove therein which defines a flow path adapted to distribute fluid from the at least one process void evenly around the process side of the diaphragm.

9. The apparatus of claim 7 wherein the process surface includes a plurality of substantially concentric annular grooves.

10. The apparatus of claim 7 wherein the floating support hub is generally cylindrical and includes an annular side wall extending between spaced-apart upper and lower ends, and a central bore extending between the upper and lower ends, wherein the side wall has a concave-curved shape that receives and supports the O-ring.

11. The apparatus of claim 10 wherein a radius of the concave-curved side wall is between about 90% and about 150% of a cross-sectional radius of the O-ring.

12. The apparatus of claim 10 wherein the floating support hub includes a convex-curved fillet disposed between the upper face and the side wall.

13. The apparatus of claim 10 wherein a radius of the fillet is about 5% to about 10% of a cross-sectional radius of the O-ring.

14. The apparatus of claim 10 wherein a height of the support hub between the upper and lower faces is between about 60% and about 90% of a cross-sectional diameter of the O-ring.

15. The apparatus of claim 7 wherein the O-ring protrudes above the immediately-surrounding portion of the process surface.

16. The apparatus of claim 7 wherein the O-ring protrudes above a diaphragm constraint plane defined by an outer perimeter of the process surface.

17. A back pressure regulator apparatus comprising:
a body defining a process surface, and including:
at least one process void communicating with the process surface;
a recess disposed in the process surface;
a floating support hub disposed in the recess, carrying an O-ring, wherein a height of the hub measured between upper and lower ends thereof is less than a cross-sectional diameter of the O-ring, and wherein a gap is present between the hub and the process surface;
a vent void communicating with the recess;
an inlet port disposed in fluid communication with the at least one process void and adapted to be coupled in fluid communication with a fluid at a process pressure; and
an outlet port disposed in fluid communication with the vent void;
a reference cap including a reference surface;
a diaphragm having opposed reference and process sides, the diaphragm constrained between the body and the reference cap such that the process side is substantially coplanar with the process surface; and
a platen loaded by a spring disposed within the reference cap such that the platen applies a reference force to the diaphragm,
wherein the diaphragm is arranged such that, in response to forces exerted on the diaphragm by the process pressure being higher than the reference force, a fluid flow path will be open that extends from the at least one process void past the O-ring to the vent void, and in response to the reference force being higher than the forces exerted on the diaphragm by the process pressure, the flow path will be closed.

18. The apparatus of claim 17 further including an adjuster assembly carried by the reference cap and acting on the spring so as to selectively vary the reference force.

19. The apparatus of claim 17 wherein the reference cap further includes a reference port disposed in fluid communication with the reference surface, the reference port adapted to be coupled in fluid communication with a fluid at a predetermined reference pressure.

20. The apparatus of claim 17 wherein the process surface incorporates at least one groove therein which defines a flow path adapted to distribute fluid from the at least one process void evenly around the process side of the diaphragm.

21. The apparatus of claim 17 wherein the process surface includes a plurality of substantially concentric annular grooves.

22. The apparatus of claim 17 wherein the floating support hub is generally cylindrical and includes an annular side wall extending between spaced-apart upper and lower ends, and a central bore extending between the upper and lower ends, wherein the side wall has a concave-curved shape that receives and supports the O-ring.

23. The apparatus of claim 22 wherein a radius of the concave-curved side wall is between about 90% and about 150% of a cross-sectional radius of the O-ring.

24. The apparatus of claim 22 wherein the floating support hub includes a convex-curved fillet disposed between the upper face and the side wall.

25. The apparatus of claim 22 wherein a radius of the fillet is about 5% to about 10% of a cross-sectional radius of the O-ring.

26. The apparatus of claim 22 wherein a height of the support hub between the upper and lower faces is between about 60% and about 90% of a cross-sectional diameter of the O-ring.

27. The apparatus of claim 17 wherein the O-ring protrudes above the immediately-surrounding portion of the process surface.

28. The apparatus of claim 17 wherein the O-ring protrudes above a diaphragm constraint plane defined by an outer perimeter of the process surface.

* * * * *